(12) United States Patent
Stover et al.

(10) Patent No.: US 9,423,065 B2
(45) Date of Patent: Aug. 23, 2016

(54) VARIABLE LEVEL PLATFORM ADJUSTMENT MECHANISM

(71) Applicants: Carl Lee Stover, Ostrander, OH (US);
 Craig T Jones, Johnstown, OH (US);
 Dennis R Weber, Delaware, OH (US)

(72) Inventors: Carl Lee Stover, Ostrander, OH (US);
 Craig T Jones, Johnstown, OH (US);
 Dennis R Weber, Delaware, OH (US)

(73) Assignee: Diverse Holdings, LLC, Delaware, OH (US)

( * ) Notice: Subject to any disclaimer, the term of this patent is extended or adjusted under 35 U.S.C. 154(b) by 480 days.

(21) Appl. No.: 13/666,911

(22) Filed: Nov. 1, 2012

(65) Prior Publication Data

US 2014/0117197 A1 May 1, 2014

(51) Int. Cl.
 *B62B 3/04* (2006.01)
 *F16M 11/18* (2006.01)
 *F16M 11/04* (2006.01)
 *B65G 1/07* (2006.01)

(52) U.S. Cl.
 CPC ............ *F16M 11/18* (2013.01); *F16M 11/046* (2013.01); *B65G 1/07* (2013.01); *F16M 2200/047* (2013.01)

(58) Field of Classification Search
 CPC ..... B62B 3/0637; B62B 3/0643; B60P 1/02; B64F 1/32; B66F 7/02; B66F 7/06; B66F 7/0625; B66F 9/20; B66F 9/06; B66F 9/00; B66B 9/16; B65G 1/06; B65G 1/07

USPC ............. 280/47.34, 79.11, 79.3, 79.5, 79.2, 280/47.41; 414/495, 913, 720; 187/240, 187/231, 222, 244
 See application file for complete search history.

(56) References Cited

U.S. PATENT DOCUMENTS

| | | | | |
|---|---|---|---|---|
| 2,251,874 A * | 8/1941 | Gibbs | ............................. | 312/71 |
| 2,626,727 A * | 1/1953 | Gibbs et al. | .................... | 312/71 |
| 2,717,085 A * | 9/1955 | Waddington | .................... | 211/74 |
| 3,635,173 A * | 1/1972 | Ruben | .......................... | 108/136 |
| 3,871,725 A * | 3/1975 | Vilen et al. | ..................... | 312/71 |
| 4,070,072 A * | 1/1978 | Skaller | ............................ | 312/71 |
| 4,449,760 A * | 5/1984 | House | .............................. | 312/42 |
| 5,167,302 A * | 12/1992 | Kinoshita | ..................... | 108/136 |
| 5,181,620 A * | 1/1993 | Watt | ............................... | 211/59.3 |
| 5,542,500 A * | 8/1996 | Emrey | .......................... | 187/273 |
| 5,626,206 A | 5/1997 | Weber | | |
| 6,035,973 A | 3/2000 | Neal | | |
| 6,044,932 A | 4/2000 | Neal | | |
| 6,364,330 B1 | 4/2002 | Weber | | |
| 6,899,347 B2 | 5/2005 | Neal | | |
| 7,481,440 B2 * | 1/2009 | Weber et al. | .............. | 280/47.34 |
| 8,662,507 B2 * | 3/2014 | Willey | ....................... | 280/47.35 |

* cited by examiner

*Primary Examiner* — Joseph Rocca
*Assistant Examiner* — Travis Coolman
(74) *Attorney, Agent, or Firm* — Miracle IP; Bryce D. Miracle

(57) ABSTRACT

An apparatus adaptable to automatic leveling platform devices with integral springs, which enables an operator to easily and quickly adjust the overall spring resistance to accommodate a range of loads applied to the platform. More particularly, the apparatus utilizes a sliding frame, springs and pins such that a user may engage or disengage one or more springs easily and quickly.

7 Claims, 12 Drawing Sheets

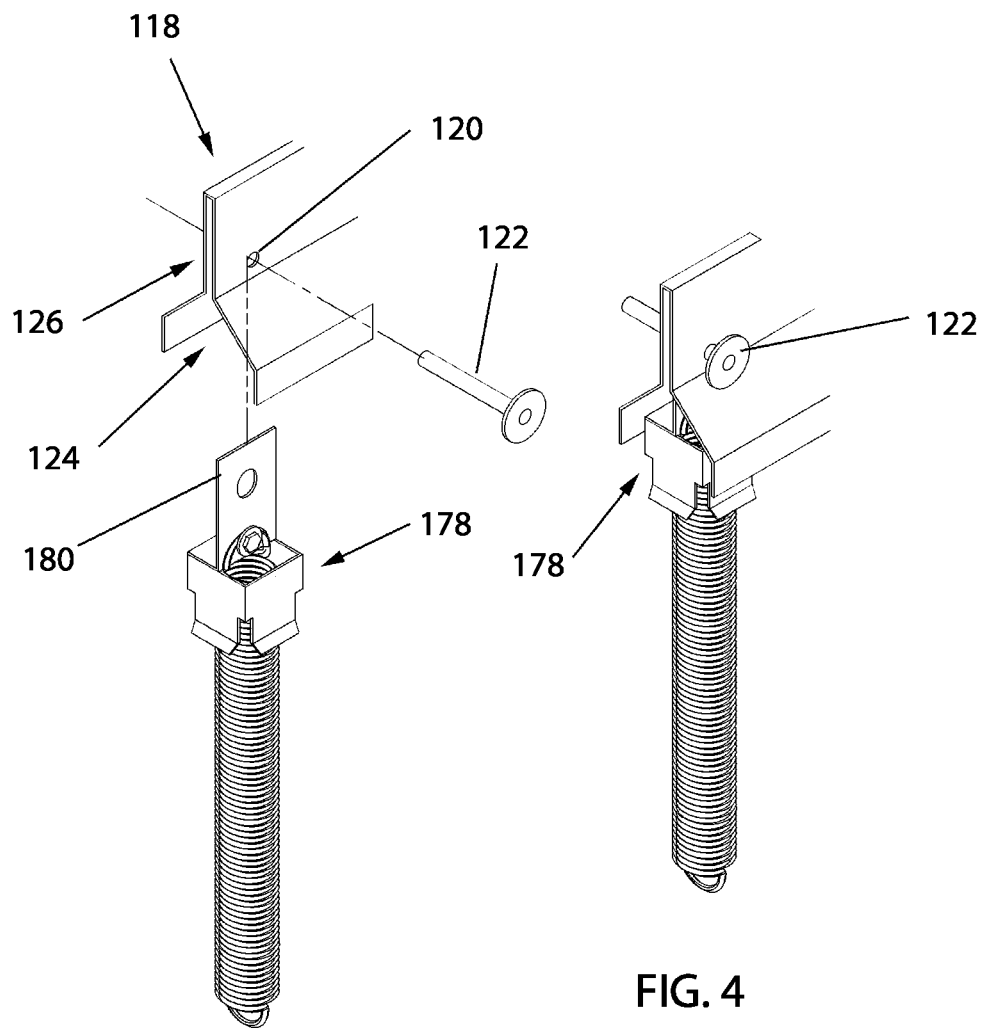

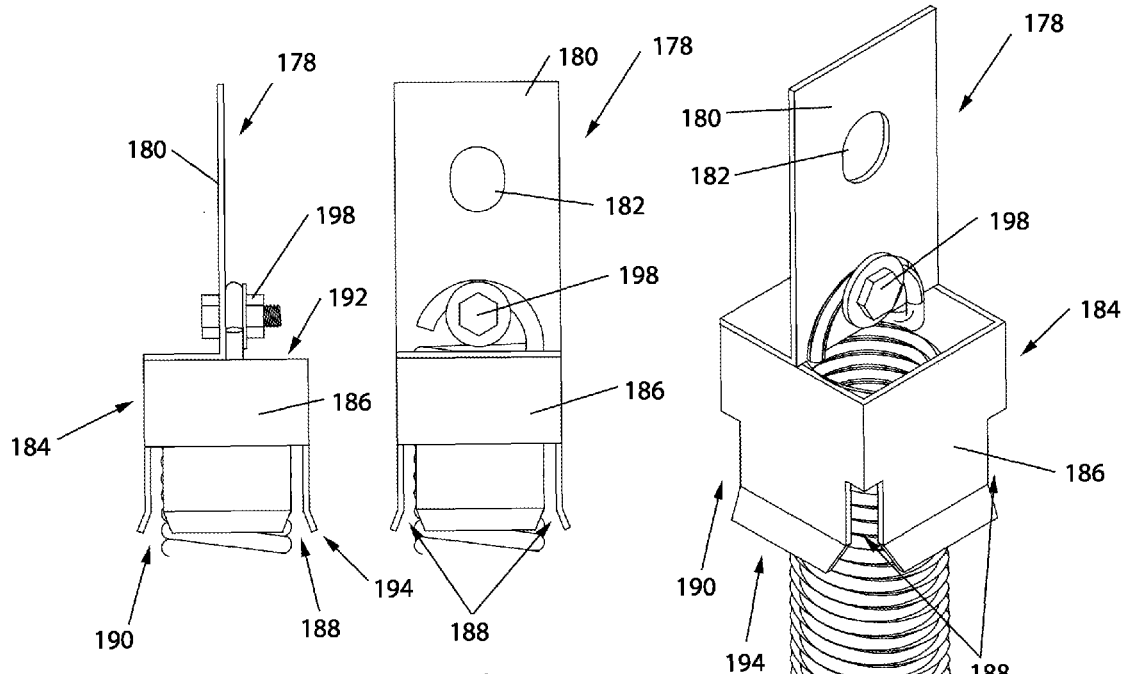

VARIABLE LEVEL PLATFORM ADJUSTMENT MECHANISM

BACKGROUND

1. Field of the Invention

The present invention pertains to a variable level platform elevator adjustment mechanism and, more particularly, to an adjustment mechanism which can be mounted within or inserted into a plurality of carts, palette loaders, truck bins, parts bins and any device that utilizes a variable level platform elevator with an integral elastic means such as springs.

2. Background

Vertical leveling platform devices for maintaining objects at a vertical position are well known in the art. These devices utilize a platform assembly and an elastic lifting means, typically a set of springs. Moreover, these devices enable an operator or user to load or remove objects from a set distance above a surface without unnecessary bending and strain on the neck, back and shoulders. Thereby reducing the risk of injury and increasing operator productivity.

As further background, vertical leveling platform devices typically utilize calibrated springs as a lifting means in order to adjust the vertical height of objects on a platform. The springs are calibrated or chosen to correspond to the weight of the objects on the platform. The spring constant of the spring (the spring constant "k" in the equation $F=kx$, where "F" equals the force supplied by the spring and "x" equals a spring displacement distance) is selected so that the weight of the objects removed will cause the platform to move through a distance "x". The distance "x" is also essentially equal to the height of the objects being removed from the platform. The force ("F") supplied by the spring causes the platform to rise to a height generally equal to the height of the objects removed. Through this mechanism, the spring keeps the objects at the proper height, so that an operator does not have to provide input to keep the objects at a proper vertical adjustment.

Through the same mechanism, the vertical leveling platform lowers the objects as additional objects are added to the platform in order to keep the objects on the platform in a vertical position that minimizes the bending required to remove an object from the platform. As objects are removed from the platform, the variable level platform device raises the level of the objects on the platform so that the objects remaining on the platform maintain the vertical position that minimizes the bending required to remove an object from the platform.

A problem commonly encountered with vertical leveling platforms is that they do not provide a quick and easy way to adjust the lifting force provided by the springs in order to accommodate different sized objects in transition to and from the platform. More particularly, they do not provide the operator with an easy way to engage or disengage each individual spring or elastic means. For the foregoing reasons, it is apparent that there is a need for a mechanism that enables an operator to quickly and easily engage or disengage said elastic means in order to provide the proper lifting force on vertical leveling platform devices. This would reduce equipment downtime and improve operator efficiency and safety.

The present invention provides a device for reducing these problems. The difficulties inherent in the art are therefore overcome in a way which is simple and efficient, while providing better and more advantageous results.

SUMMARY

In accordance with the invention, an adjustment mechanism is provided to adapt to a variable level platform elevator such that an operator can easily and quickly increase or decrease the overall lifting force by engaging or disengaging a select number of elastic means, typically springs.

The adjustment mechanism comprises a first frame assembly and a second frame assembly. The first frame assembly comprises an engaged support means. The second frame assembly comprises a disengaged support means and a connection member. The frame assemblies are connected such that they move towards and away from each other within and along the same plane. An elastic lifting means is provided by one or more elastic means or springs with a first end and a second end. The first end is operatively connected to the second frame connection member and said second end has the ability to operatively engage either the first frame assembly engaged support means or to operatively engage the second frame assembly disengaged support means. This enables an operator to easily and selectively increase or decrease the tension force applied between the first and second frame assembly by engaging or disengaging one or more elastic means with the engaged support means. The non-engaged elastic means, by default, operatively connect to, or rest on the disengaged support means.

In an embodiment of the invention, the adjustment mechanism may utilize a unique and inventive fastening bracket that attaches to the second end of the elastic means which has the ability to either operatively engage the first frame assembly engaged support means or to operatively engage the second frame assembly disengaged support means.

The adjustment mechanism can be made portable, adaptable, or permanent to a plurality of carts, palette loaders, truck bins, parts bins and any device that utilizes a variable level platform elevator with integral elastic mean such as springs. Particularly, it can be outfitted to meet the needs of the manufacturing and merchandising industries.

Still other benefits and advantages of the invention will become apparent to those skilled in the art to which it pertains upon a reading and understanding of the following detailed specification.

BRIEF DESCRIPTION OF THE DRAWINGS

These and other features, aspects, and advantages of the present invention will become better understood with regard to the following description, appended claims, and accompanying drawings where:

FIG. 3 is a side cut-a-way close-up of the non-engaged engagement bracket.

FIG. 4 is a side cut-a-way close-up of the engaged bracket.

FIG. 5 is a close-up of spring and engagement bracket.

FIG. 6 is a front close-up view of spring and engagement bracket.

FIG. 7 is a side close-up view of spring and engagement bracket.

DESCRIPTION

Figure 1A:
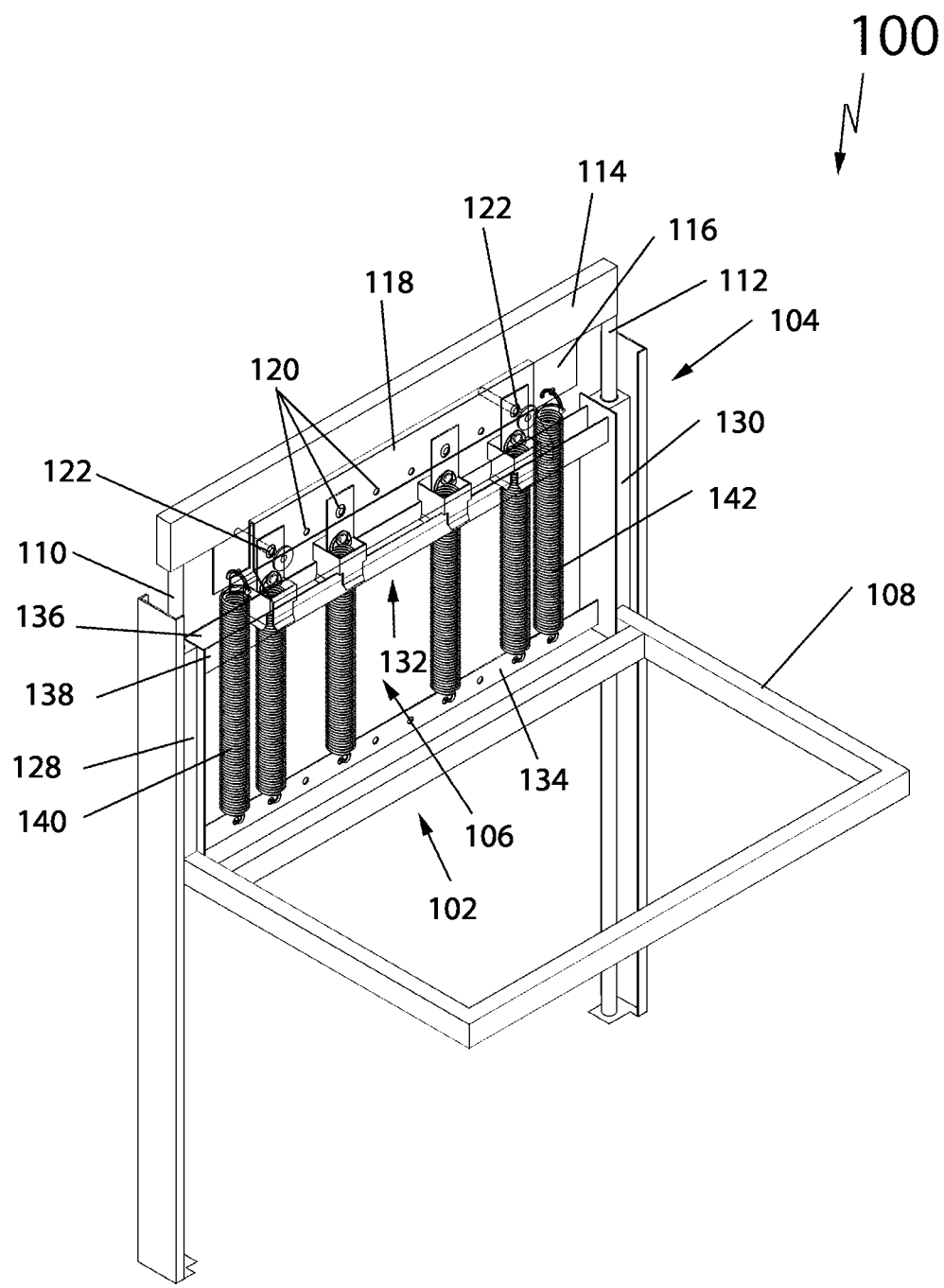
FIG. 1A is a platform raised perspective view of an apparatus embodying features of the present invention.

Referring now to the drawings wherein the showings are for purposes of illustrating a preferred embodiment of the invention only and not for purposes of limiting the same, the present invention is a mechanism for easily increasing or decreasing the resistance of a downward load on a variable platform elevator which maximizes operators efficiency and ease of use.

With reference to FIGS. 1A, 1B, 1C, 2 and 3, an embodiment 100 of the present invention comprises an inner vertical frame assembly 102 and an outer vertical frame assembly 104. The inner vertically frame assembly 102 is moveable within the outer vertical frame assembly 104. One or more elastic means 106 are provided to lift inner vertical frame assembly 102 within outer vertical frame assembly 104. First embodiment 100 further comprises a platform 108 which is rigidly attached generally horizontal and perpendicular to the inner vertical frame assembly 102.

The outer vertical frame assembly 104 comprises guide rods 110 and 112 vertically disposed and fixedly connected by horizontal cross member 114. An engagement support means is provided, engaged support member 116 which is mounted below and horizontal to the cross member 114. The engaged support means can be any elongated support that maintains the ability to engage and support the elastic means 106. It will be generally known that in other embodiments cross member 114 and engaged support member 116 may be one in the same. Engaged support member 116 comprises an optional vertical guide bracket 118 and a plurality of engagement openings 120 which can be a hole, slot, or any other means adaptable to receive a fastening means or removable pin 122. When a vertical guide bracket 118 is included in the adjustment mechanism, engagement openings 120 pass through both engaged support member and vertical guide bracket 118, thus allowing said pin 122 to pass through allowing it to be easily removed or inserted. Vertical guide bracket 118 is depicted up close in FIG. 3 and comprises an elongated channel 124 with a vertical engagement member slot 126.

The inner vertical frame assembly 102 comprises deck guides 128 and 130 vertically disposed for receiving guide rods 110 and 112. Inner vertical frame assembly 102 further comprises a disengage support means, disengaged support member 132 and a connection member 134. The disengaged support means can be any elongated horizontal support that maintains the ability to engage and support the elastic means 106 when elastic means is disengaged from engaged support member 116. Disengaged support member 132 comprises, for purposes of this embodiment, two horizontally disposed parallel brackets 136 and 138. The horizontally disposed parallel brackets 136 and 138 are spaced a sufficient distance apart such that the elastic means 106 pass unhindered between them. It will be known that disengaged support member 132 may be configured in any way that supports the spring in the disengaged position. The horizontally disposed parallel brackets 136 and 138 are preferred because of its favorable functionality, however not required in all versions of the invention.

Figure 1B:
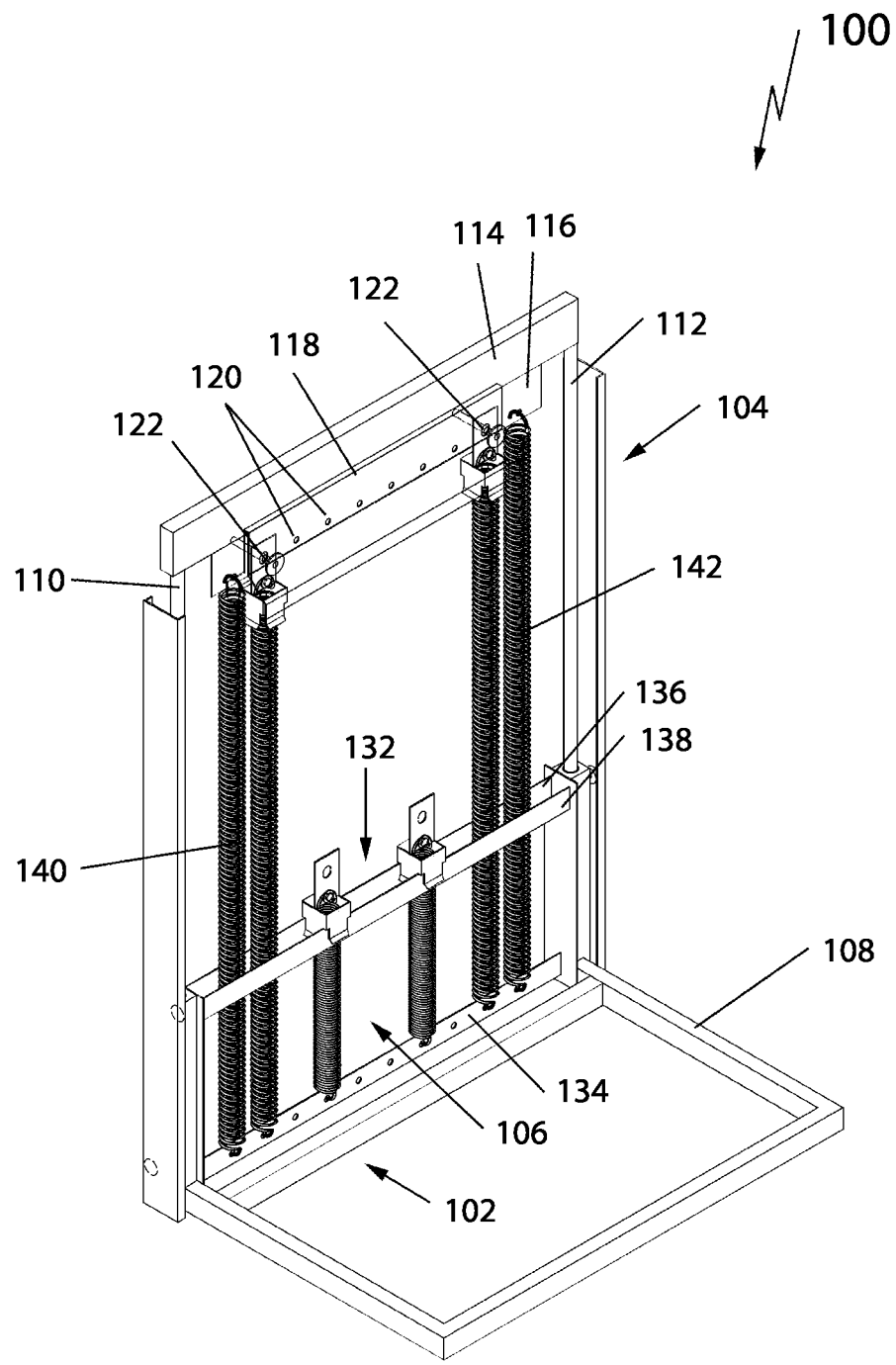
FIG. 1B is a platform fully loaded view of an apparatus embodying features of the present invention.
Figure 1C:
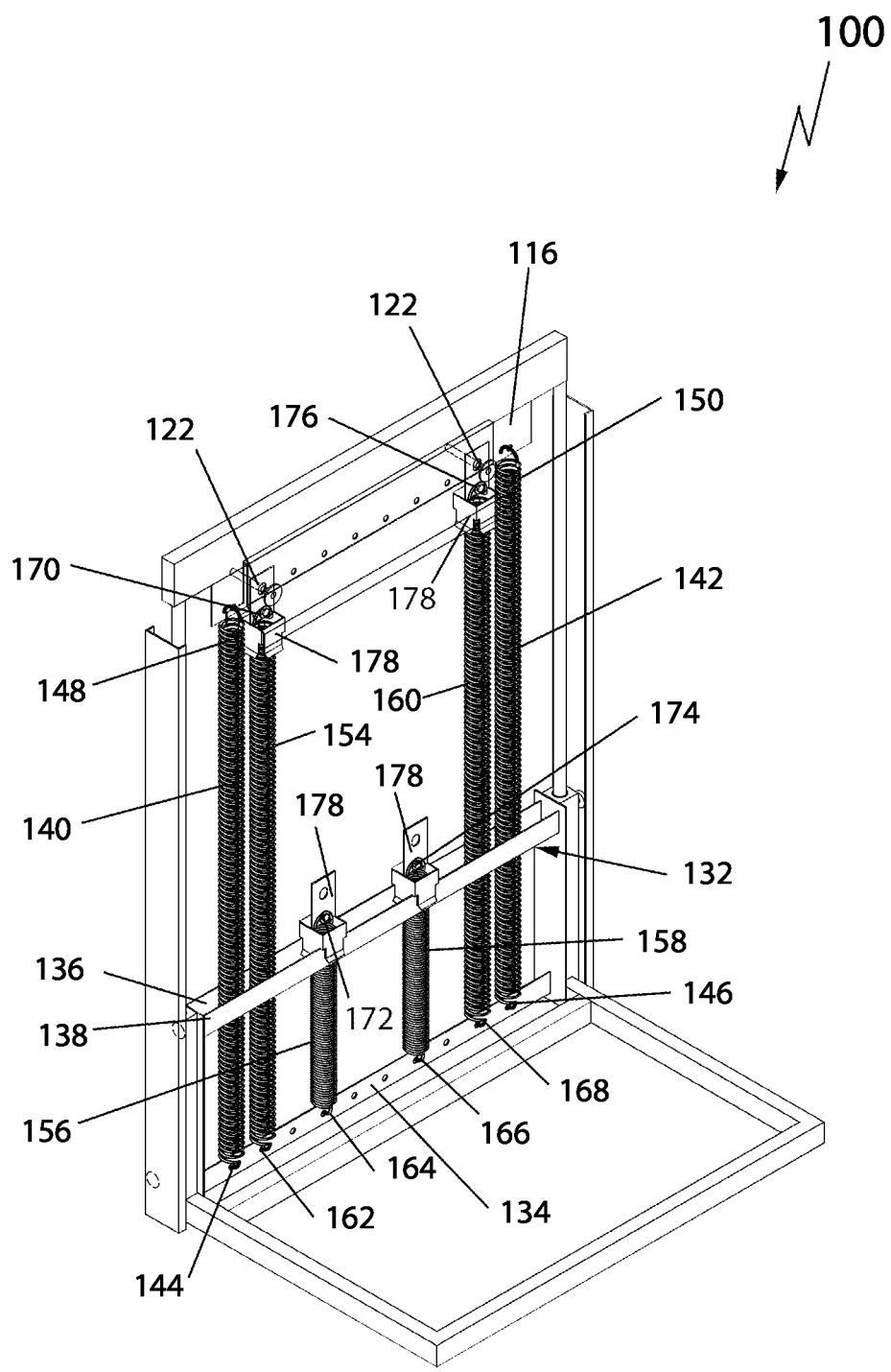
FIG. 1C is a platform fully loaded view of an apparatus embodying features of the present invention.
Figure 2:
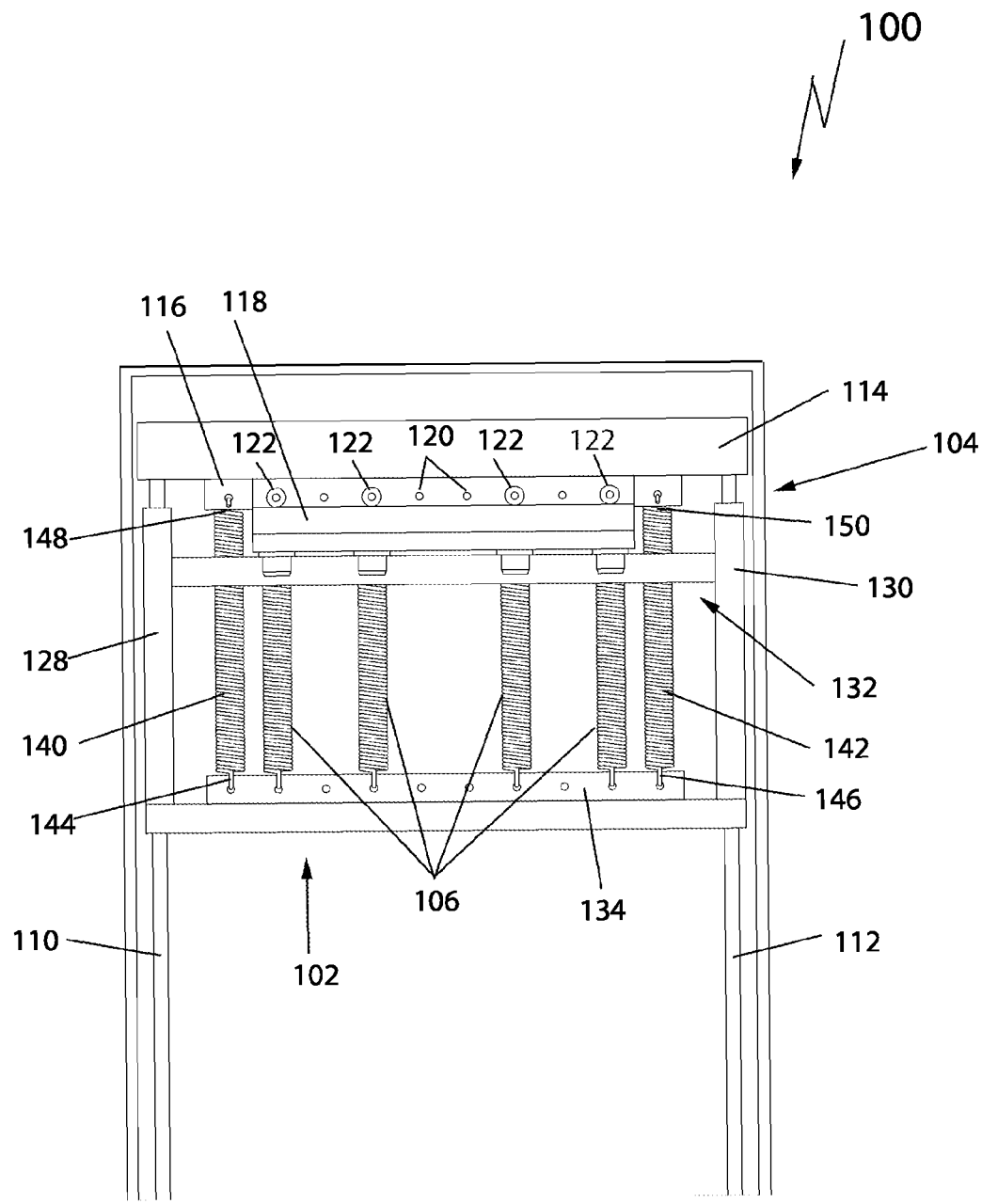
FIG. 2 is a front elevated view of an apparatus embodying features of the present invention in the default position.

Referring to FIG. 1C, the one or more elastic means, springs 154, 156, 158 and 160 have first ends 162, 164, 166 and 168 and second ends 170, 172, 174 and 176. First ends 162, 164, 166 and 168 are operatively connected to the connection member 134. The second ends 170, 172, 174 and 176 are attached to an engagement means, fastening brackets 178. The engagement means can be any bracket configuration that has the ability to engage either the engagement support means or to engage or be supported by the disengaged support means. With that said, fastening bracket 178 is adapted to either engage engaged support member 116 by pin 122 or resort to a default resting position on disengaged support member 132 comprising the horizontally disposed parallel brackets 136 and 138.

A constant elastic means, constant springs 140 and 142 are provided having first ends 144 and 146 and second ends 148 and 150. First ends 144 and 146, are operatively connected to the connection member 134 and second ends 148 and 150 are operatively connected to the engagement support member 116. Constant springs 140 and 142 are optionally provided as an elastic means to ensure a constant and minimal lifting force on inner vertical frame assembly 102 within outer vertical frame assembly 104 to ensure that adjustment mechanism always returns to its default position as discussed below. It will be known that the addition of constant elastic means are an optional feature and are not essential to the invention.

FIGS. 3, 4, 5, 6 and 7, show an embodiment of an engagement means, engagement bracket 178 which comprises a frame assembly 184 with four vertical sides 186 with a top 192 and bottom 194 that form a hollow rectangular configuration. Frame assembly 184 further comprises a means for engaging a horizontal support means, a first pair and second pair of horizontally aligned slot openings 188 and 190 near bottom 194 of said frame assembly 184 which are adapted to securely receive and embrace the horizontally disposed parallel brackets 136 and 138 depicted in FIGS. 1A, B, and C. Engagement bracket 178 further comprises a vertical engagement member 180 with engagement opening 182. Vertical engagement member 180 is affixed near the top 192 of the frame assembly 184. The engagement bracket 178 is attached to an elastic means, spring 196 by a fastening means 198.

Referring to FIGS. 1-7, the operation of the embodiment 100 will be explained. FIG. 1A depicts the first embodiment in a default position whereby no downward force is being applied to platform frame 108 or inner vertical frame assembly 102. Embodiment maintains tendency to achieve default position by way of the constant and minimal lifting force provided by constant springs 140 and 142. While in the default position, operator may optionally engage or disengage springs 154, 156, 158 and 160 by inserting pins 122 in desired corresponding engagement openings 120 thereby incrementally increasing or decreasing the resistance applied to inner vertical frame assembly 102. This provides the operator the ability to select the proper level of resistance for a specific load on the platform 108.

Once the proper resistance is selected to accommodate the specified load, first embodiment 100 is ready for operative use. During operation, the platform lowers as objects are added to the platform in order to keep the objects on the platform in a vertical position that minimizes the bending required to remove an object from the platform. Transversely, as objects are removed from the platform, first embodiment 100 raises the level of the objects on the platform so that the objects remaining on the platform maintain the vertical position that minimizes the bending required to remove an object from the platform. More specifically, while the load increases on the platform 108, the level of the platform lowers approximately the height of the object added and when the load on the platform 108 decreases, the platform raises approximately the height of the object removed. When no load is applied to platform 108 the first embodiment 100 returns to the default positions as depicted in FIG. 1A.

FIGS. 1B and 1C depict the embodiment 100 in operative use whereby a downward force is being applied to the platform frame 108 and the inner vertical frame assembly 102. As depicted, elastic means, springs 154 and 156 are in the engaged position secured by pins 122 and fastening bracket 178 further detailed in FIG. 4. Springs 158 and 160 are depicted in the disengaged position whereby engagement bracket 178 is not being secured by pins 122, but are engaged to or resting upon disengaged support member 132 partially depicted by FIG. 3. More particularly, the first and second pair of horizontally aligned slot openings 188 and 190 in the frame assembly 184 embrace and overlay upon the horizontally disposed parallel brackets 136 and 138 while maintaining position by the minimal tension of springs 158 and 160.

Figure 8:
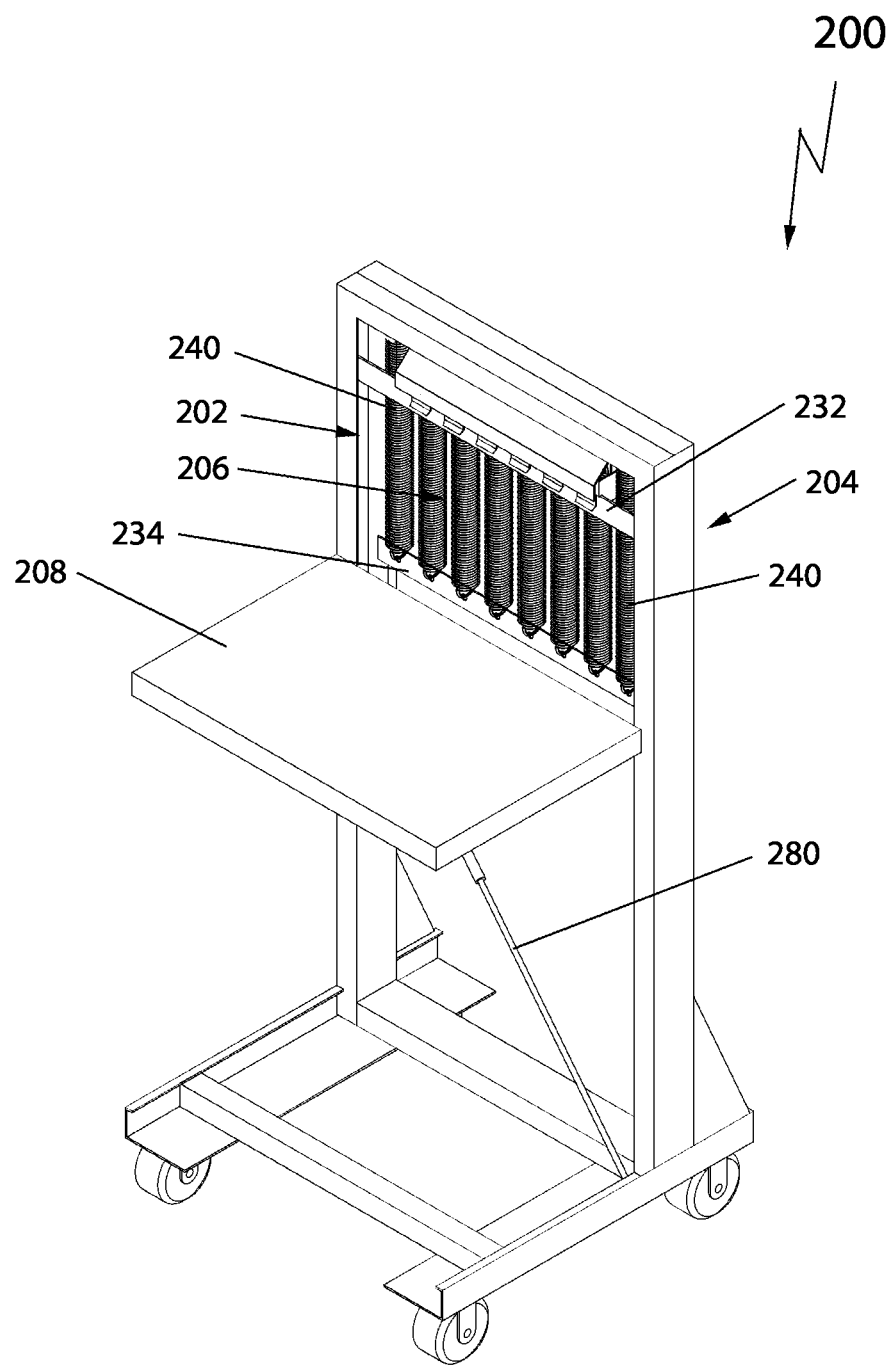
FIG. 8 is a platform raised perspective view of an embodiment of the invention installed in a tote cart.
Figure 9:
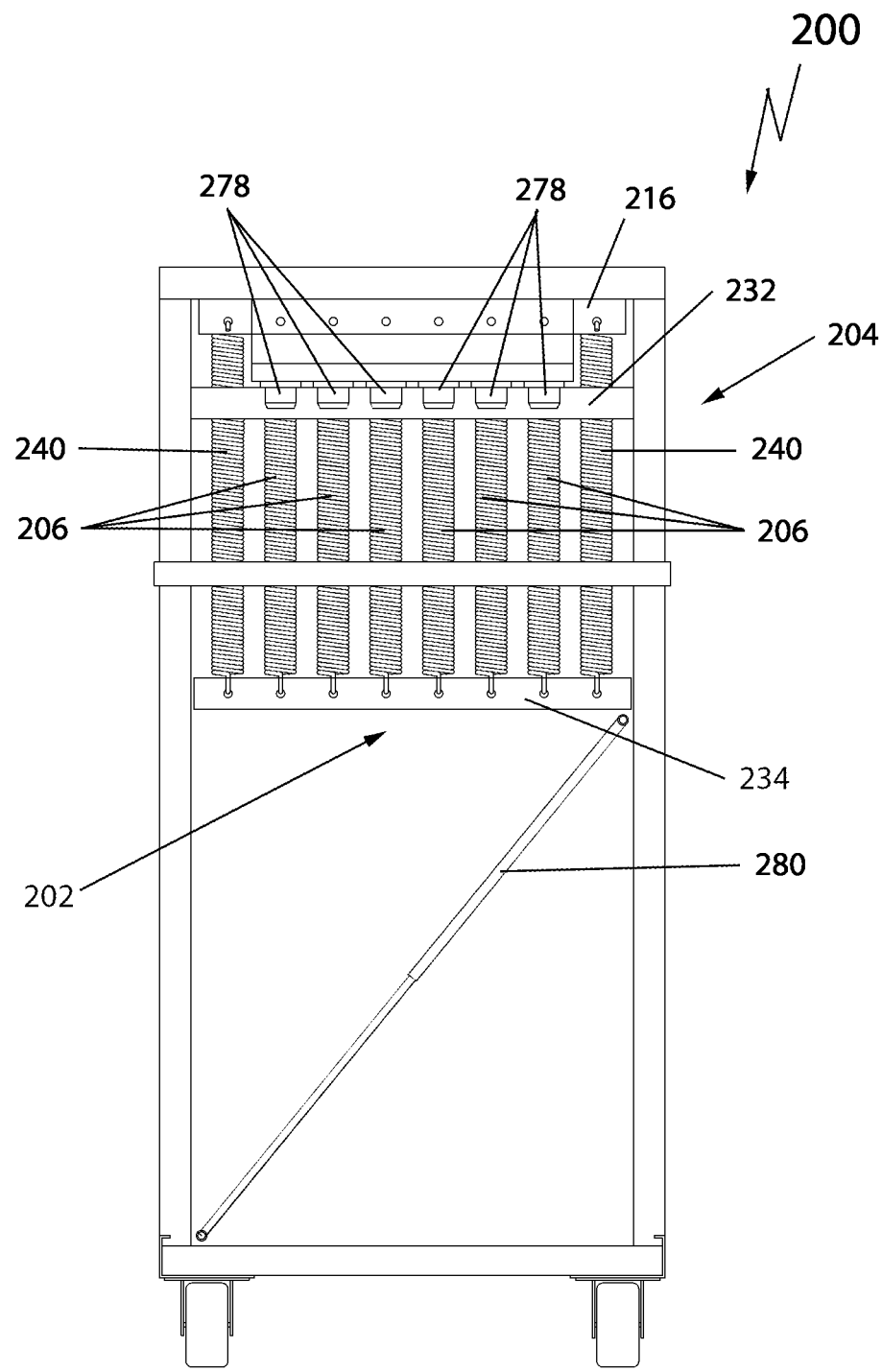
FIG. 9 is a back elevated view of an embodiment of the invention installed in a tote cart in the default position.
Figure 10:
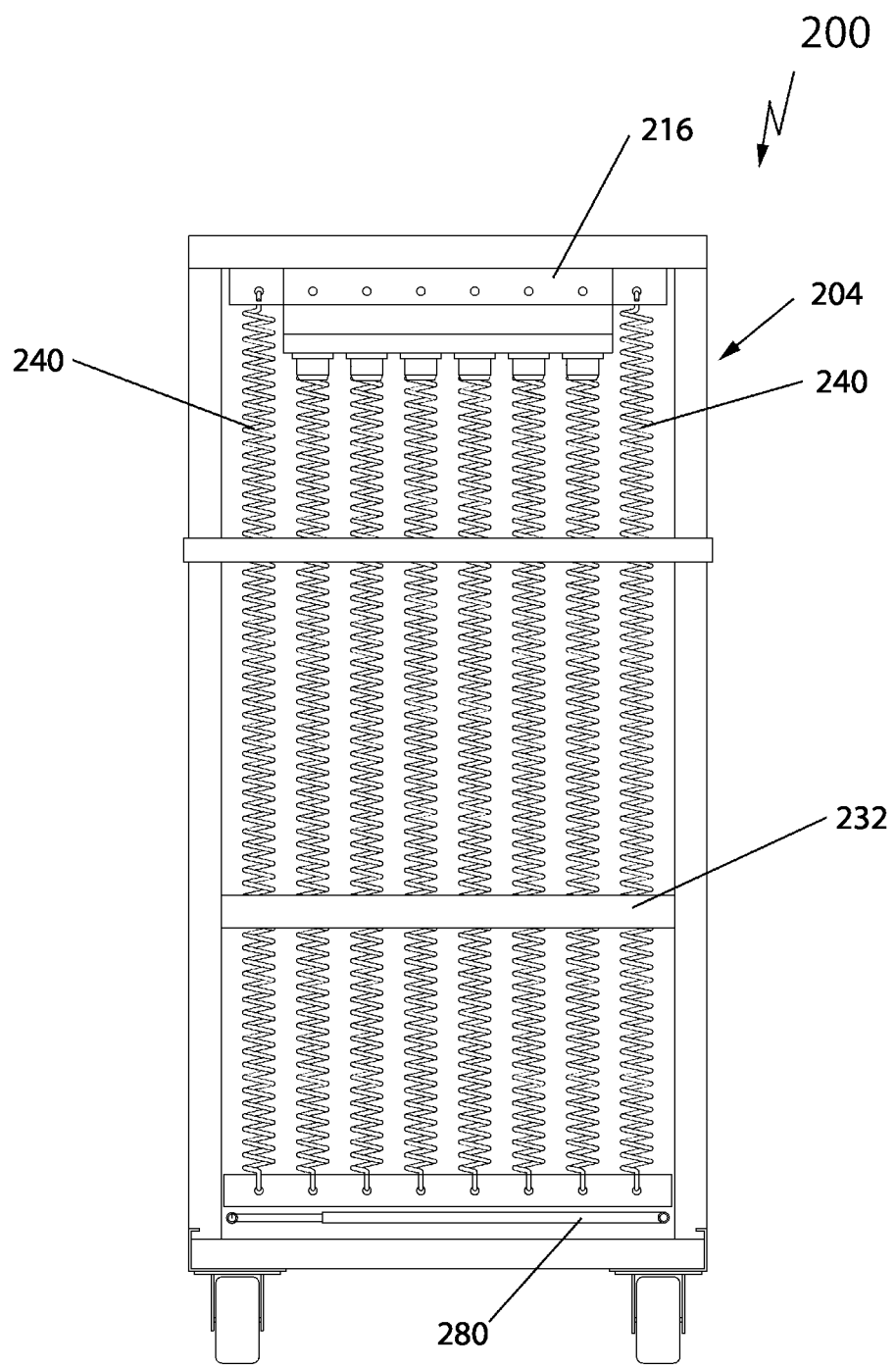
FIG. 10 is a back elevated view of an embodiment of the invention installed in a tote cart in the fully loaded position.

FIGS. 8, 9 and 10, depict a tote cart 200 which utilizes and contains the inventive concept. Tote Cart 200 comprises an inner vertical frame assembly 202 and an outer vertical frame assembly 204. The inner vertically frame assembly 202 is moveable within the outer vertical frame assembly 204. Elastic means, springs 206 are provided to lift inner vertical frame assembly 202 within outer vertical frame assembly 204. Tote cart 200 further comprises a platform 208 which is rigidly attached generally horizontal and perpendicular to the inner vertical frame assemblies 202.

Tote cart 200 comprises springs 206 which ends are operatively connected to the connection member 234 and fixedly attached to the fastening brackets 278. Fastening brackets 278 are adapted to either engage engaged support member 216 by a pin or other means or revert to a default position resting on disengaged support member 232.

Tote cart 200 further comprises optional constant springs 240 which are operatively connected to the connection member 234 and to the engagement support member 216. Constant springs 240 coupled with a hydraulic lifting means, hydraulic 280 are provided to ensure a constant and minimal lifting force on inner vertical frame assembly 202 within outer vertical frame assembly 204 whereby inner frame assembly 202 and platform 208 will revert to the default position when cart is not loaded as depicted in FIGS. 8 and 9.

Figure 11:
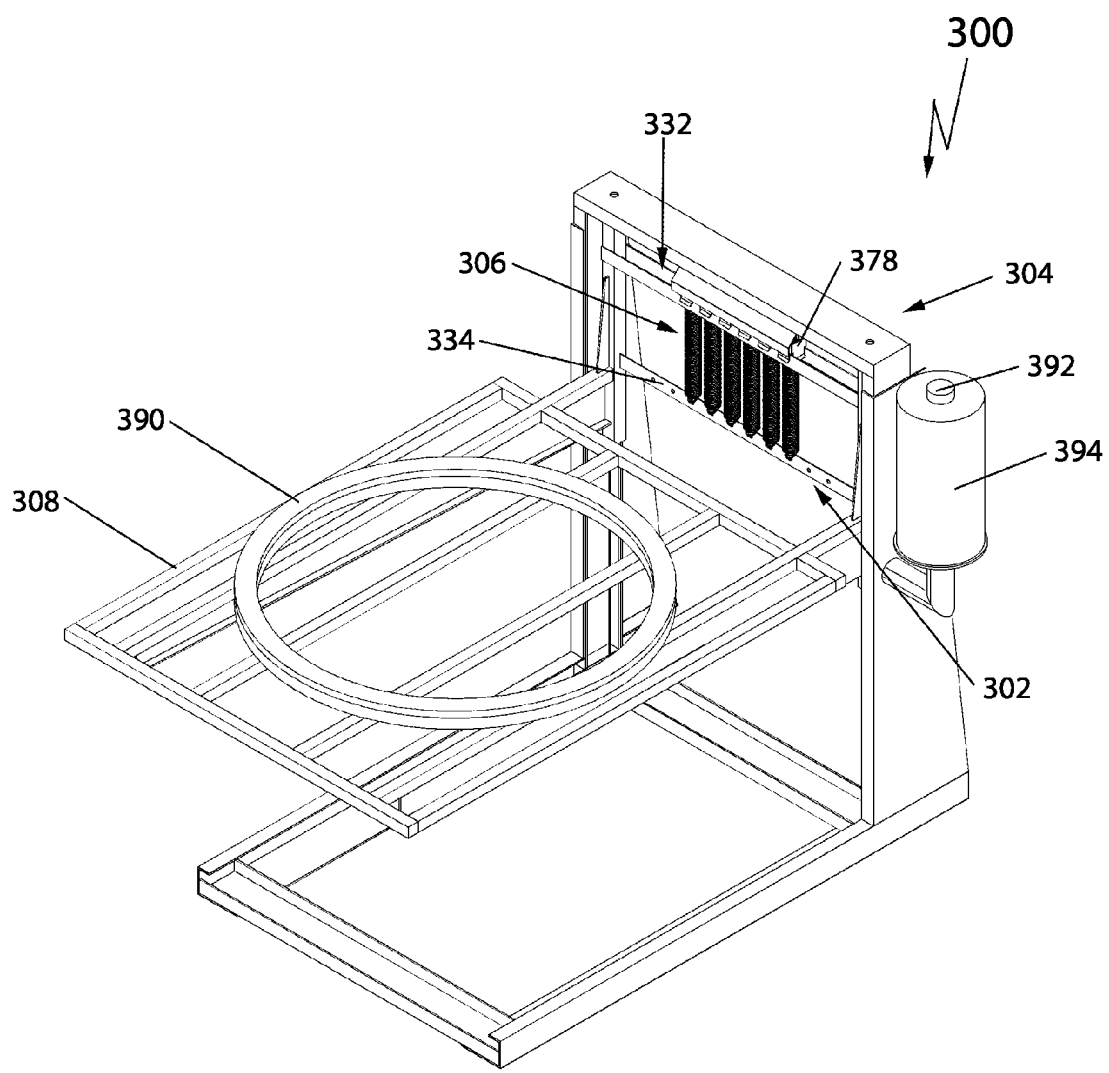
FIG. 11 is a platform raised perspective view of an embodiment of the invention installed in a pallet cart.
Figure 12:
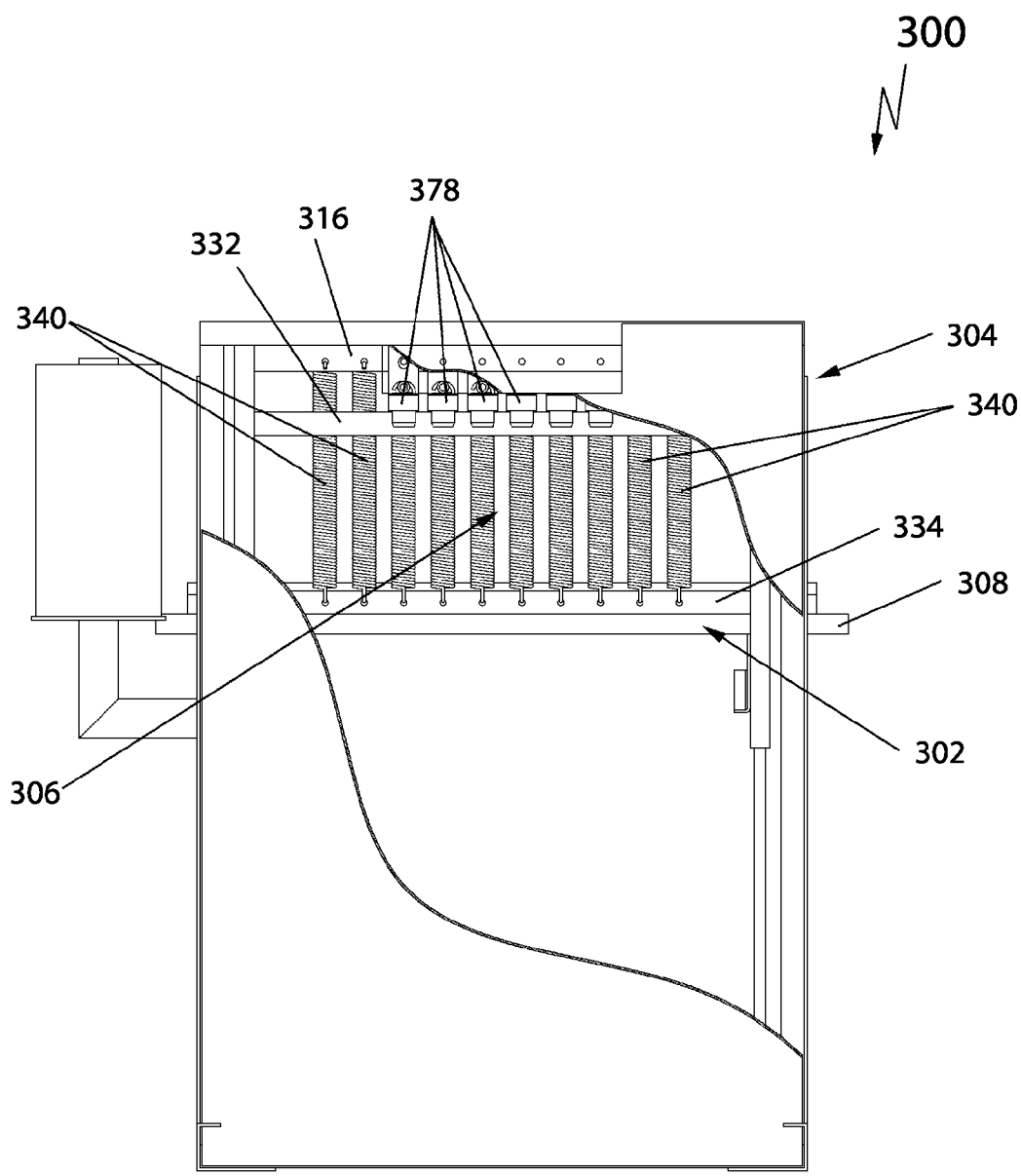
FIG. 12 is a rear elevated view of an embodiment of the invention installed in a pallet cart.
Figure 13:
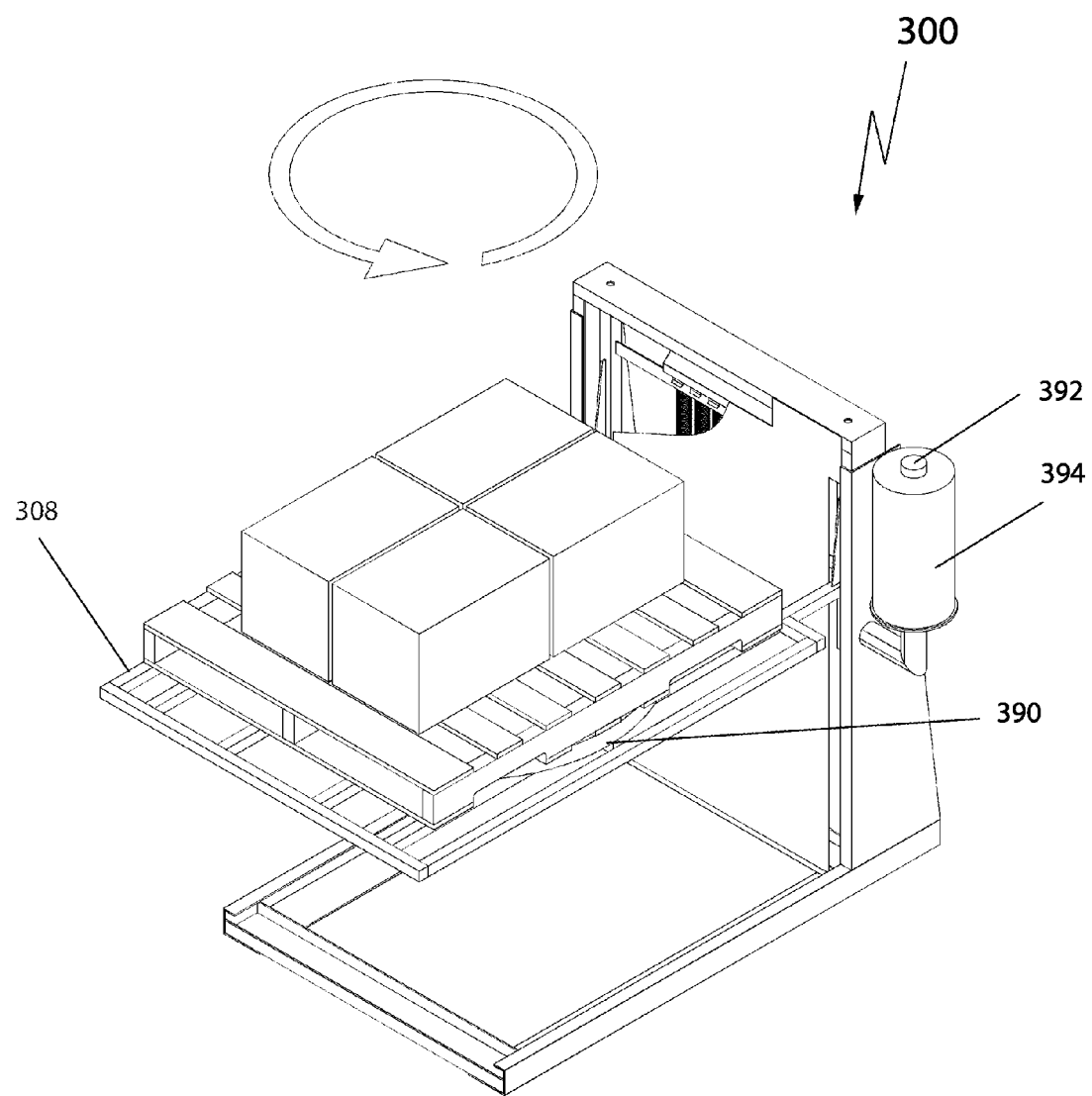
FIG. 13 is a perspective view of the invention installed in a pallet cart depicting objects on the platform.

FIGS. 11, 12 and 13, depict a palette cart 300 which is yet another example of the utilization of the inventive concept. Palette cart 300 comprises an inner vertical frame assembly 302 and an outer vertical frame assembly 304. The inner vertically frame assembly 302 is moveable within the outer vertical frame assembly 304. Elastic means, springs 306 are provided to lift inner vertical frame assembly 302 within outer vertical frame assembly 304. Palette cart 300 further comprises a platform 308 which is rigidly attached generally horizontal and perpendicular to the inner vertical frame assemblies 302.

Palette cart 300 comprises springs 306 which ends are operatively connected to the connection member 334 and fixedly attached to the fastening brackets 378. Fastening brackets 378 is adapted to either engage engaged support member 316 by a pin or other means or revert to a default position resting on disengaged support member 332.

Palette cart 300 further comprises optional constant springs 340 which are operatively connected to the connection member 334 and to the engagement support member 316. Constant springs 340 are provided to ensure a constant and minimal lifting force on inner vertical frame assembly 302 within outer vertical frame assembly 304 without the need of engagement of springs 306 whereby inner frame assembly 302 and platform 308 will revert to the default position when cart is not loaded as depicted in FIGS. 11 and 12.

Referring to FIGS. 11 and 13, palette cart 300 further comprises a rotating means 390 on platform 308 that has the ability to rotate a palette or other load placed on the platform 308 360 degrees. Palette 300 further comprises a vertical spindle 392 that is adapted to receive a roll of industrial wrapping 394 or other wrapping means. Referring to FIG. 13, as loads are incrementally increased and stacked on platform 308, industrial wrapping 394 can be simultaneously applied and wrapped around the loads via spindle 392 and rotating means 390 as platform 308 descends to accommodate the load.

FIGS. 8 and 11 depict the cart tote 200 and the palette cart 300 in the default position. In the default position, operator of the equipment may optionally engage or disengage springs 254 and 354 by way of fastening bracket 278 and 378, thereby incrementally increasing or decreasing the resistance applied to inner vertical frame assembly 202 and 302. This provides the operator the ability to select the proper level of resistance for a specific load on the platform 208 and 308.

All of the embodiments of the present invention can be made portable, adaptable, or permanent and fit to any size of a plurality of carts, palette loaders, truck bins, parts bins and any device that utilizes a variable level platform elevator with integral elastic mean such as springs. Particularly, it can be outfitted to meet the needs of the manufacturing and merchandising industries.

The present invention can be made in any manner and of any material chosen with sound engineering judgment such as steel. The materials may be strong, lightweight, long lasting, economic, and ergonomic.

The previously described versions of the present invention have advantages, including the ability to quickly and easily engage or disengage one or more elastic means in order to increase or decrease the applied force on the inner vertical frame and platform. Moreover, the disengaged support member allows disengaged springs to rest upon and easily be stowed in a disengaged position for quick and easy access for future needs.

Although preferred embodiments of the invention have been described in considerable detail, other versions and embodiments of the invention are possible. For example, the invention could be configured to function properly with elements interchanged within the inner and outer frame assemblies. The outer frame assembly could comprise a connection member operatively connected to all of the elastic means and a disengaged support member there below. The inner frame assembly would only comprise the engagement support member. The configuration would allow the operator to operate the embodiment substantially as described above; however, the engagement support member and engaged elastic means with pins and the like would move with the inner frame as force is applied to the platform. Therefore, the present invention should not be limited to the preferred embodiments described herein, but instead is defined by the spirit and scope of the appended claims.

What is claimed is:

1. An adjustment mechanism, comprising:
   (a) an outer vertical frame assembly, comprising an engaged support means;
   (b) an inner vertical frame assembly that is operatively connected to vertically move within and along the same plane as the outer vertical frame assembly, the inner vertical frame assembly comprising:
      (i) a disengaged support means comprising two horizontally disposed parallel brackets; and
      (ii) a connection member;
   (c) one or more elastic means for lifting the inner vertical frame assembly within the outer vertical frame assembly, the one or more elastic means comprising a first and second end, the first end operatively connected to the connection member; and
   (d) a fastening bracket connected to the second end, the fastening bracket having an engaged position and a disengaged position and:
      (i) a fastening bracket frame assembly comprising four side members which are joined to form a hollow rectangular configuration with a top and a bottom, the fastening bracket frame assembly having a first pair and a second pair of horizontally aligned slot opening near bottom of the bracket frame assembly, whereby allowing the fastening bracket to securely embrace and rest on the horizontally disposed parallel brackets while in the disengaged position via the first and second pair of horizontally aligned slot openings respectively; and
      (ii) a vertical engagement member fixedly attached to the top of the bracket frame assembly, the vertical engagement member comprises an engagement opening adapted to receive a fastening means while the fastening bracket is in the engaged position, whereby an operator can easily increase or decrease a required lifting force by engaging or disengaging one or more of said one or more elastic means from the engaged support means.

2. The adjustment mechanism of claim 1, further comprising a platform, the platform being generally horizontal and rigidly attached to the inner vertical frame assembly.

3. The adjustment mechanism of claim 1, further comprising a constant elastic means for applying a minimal constant lifting force on the inner vertical frame assembly, whereby enabling the adjustment mechanism to always return to a default position without the thereby of one or more of the elastic means.

4. An adjustment mechanism, comprising:
   (a) an outer vertical frame assembly comprising:
      (i) one or more removable pins; and
      (ii) an engaged support member comprising one or more openings adaptable to receive the one or more pins;
   (b) an inner vertical frame assembly that is vertically moveable within the outer vertical frame assembly, the inner vertical frame assembly comprising:
      (i) a disengaged support member; and
      (iii) a connection member;
   (c) one or more elastic means for increasing or decreasing lifting force on the inner vertical frame assembly within the outer vertical frame assembly, the one or more elastic means having a first and second end, the first end operatively connected to the connection member; and
   (d) a fastening bracket connected to the second end of the one or more elastic means, the fastening bracket having an engaged position and a disengaged position and a vertical engagement member having an opening, the fastening bracket adapted to couple with the engaged support member while in the engaged position by selectively engaging a removable pin by inserting the removable pin into the engaged support member and the vertical engagement member opening, and adapted to be supported by the disengaged support member while in the disengaged position; whereby an operator can select the amount of overall lifting force on the inner vertical frame assembly by engaging or disengaging a required number of said one or more elastic means with the engaged support member.

5. The adjustment mechanism of claim 4, further comprising a platform, the platform being generally horizontal and rigidly attached to the inner vertical frame assembly.

6. The adjustment mechanism of claim 4, further comprising a constant elastic means for applying a minimal constant lifting force on the inner vertical frame assembly comprising one or more springs having a first and second end, the first end of one or more springs operatively connected to the connection member and the second end of one or more springs operatively connected to the outer vertical frame assembly.

7. The adjustment mechanism of claim 4, wherein the disengaged support member comprises two horizontally disposed parallel brackets spaced sufficiently apart to enable said elastic means to pass freely between them and to engage said fastening bracket in the disengaged position.

* * * * *